United States Patent
Bader et al.

(10) Patent No.: US 10,342,027 B2
(45) Date of Patent: Jul. 2, 2019

(54) SCHEDULING ALGORITHM FOR LINEAR NETWORKS

(71) Applicant: KING ABDULLAH UNIVERSITY OF SCIENCE AND TECHNOLOGY, Thuwal (SA)

(72) Inventors: Ahmed Bader, Tla'a Al-Ali District (JO); Mohamed-Slim Alouini, Thuwal (SA); Yassin Ayadi, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 15/745,776

(22) PCT Filed: Aug. 2, 2016

(86) PCT No.: PCT/IB2016/054659
§ 371 (c)(1),
(2) Date: Jan. 18, 2018

(87) PCT Pub. No.: WO2017/021892
PCT Pub. Date: Feb. 9, 2017

(65) Prior Publication Data
US 2018/0213543 A1    Jul. 26, 2018

Related U.S. Application Data

(60) Provisional application No. 62/201,246, filed on Aug. 5, 2015.

(51) Int. Cl.
*H04W 72/12* (2009.01)
*H04W 84/18* (2009.01)
(Continued)

(52) U.S. Cl.
CPC ..... *H04W 72/121* (2013.01); *H04W 52/0209* (2013.01); *H04W 52/0216* (2013.01);
(Continued)

(58) Field of Classification Search
CPC ..... H04W 4/38; H04W 12/009; H04W 84/18; H04W 24/10; H04W 72/12;
(Continued)

(56) References Cited

U.S. PATENT DOCUMENTS 7,091,854 B1    8/2006   Miao
2008/0158062 A1*   7/2008   Fullerton ............. G01S 5/0289
                                                           342/463
(Continued)

FOREIGN PATENT DOCUMENTS

WO    2014072830 A2    5/2014
WO    2014076577 A2    5/2014

OTHER PUBLICATIONS

International Search Report in related International Application No. PCT/IB2016/054659, dated Oct. 26, 2016.
(Continued)

*Primary Examiner* — Ashley Shivers
(74) *Attorney, Agent, or Firm* — Patent Portfolio Builders PLLC (57) ABSTRACT

In accordance with the present disclosure, embodiments of an exemplary scheduling controller module or device implement and improved scheduling process such that the targeted reduction in schedule length can be achieve while incurring minimal energy penalty by allowing for a large rate (or duration) selection alphabet.

20 Claims, 9 Drawing Sheets

(51) Int. Cl.
*H04W 72/00* (2009.01)
*H04W 52/02* (2009.01)
(52) U.S. Cl.
CPC ........... *H04W 72/00* (2013.01); *H04W 84/18* (2013.01); *Y02D 70/00* (2018.01)
(58) Field of Classification Search
CPC ......... H04W 72/1226; H04W 72/1205; H04W 72/121; H04W 28/0221
See application file for complete search history.

(56) References Cited

U.S. PATENT DOCUMENTS

| | | | | |
|---|---|---|---|---|
| 2009/0207769 | A1* | 8/2009 | Park | H04W 74/04 370/311 |
| 2011/0134756 | A1* | 6/2011 | Park | H04L 43/0894 370/238 |
| 2011/0296271 | A1* | 12/2011 | Tan | H04B 7/15592 714/752 |
| 2016/0212729 | A1* | 7/2016 | Bulten | H04W 72/048 |
| 2016/0323839 | A1* | 11/2016 | Davis | H04W 56/0015 |

OTHER PUBLICATIONS

Written Opinion of the International Searching Authority in related International Application No. PCT/IB2016/054659, dated Oct. 26, 2016.

* cited by examiner

FIG. 1

N = 5 nodes
Utilization matrix U, for N odd

| 1 | 2 | 3 | 4 | 5 | GW |
|---|---|---|---|---|---|
| A |   | A |   | A | 5 |
|   | F |   | F |   |   |
|   |   | C |   | C | 3 |
|   |   |   | H |   |   |
|   |   |   |   | E | 1 |
|   | G |   | G |   |   |
|   |   | B |   | B | 4 |
|   |   |   | I |   |   |
|   |   |   |   | D | 2 |

FIG. 2

N = 5 nodes
rate matrix T, for N odd

| A | F | A | F | A |
|---|---|---|---|---|
|   | G | B | G | B |
|   |   | C | H | C |
|   |   |   |   | D |
|   |   |   |   | E |

N=5 nodes
Search matrix $X$, for N odd

| A | | | | | | | | |
|---|---|---|---|---|---|---|---|---|
| | F | | | | | | | |
| | | B | | | | | | |
| | | | G | | | | | |
| | | | | C | | | | |
| | | | | | H | | | |
| | | | | | | D | | |
| | | | | | | | I | |
| | | | | | | | | E |

Table 1  SINR(dB) 1% BLER  Pt@R=50m

| Constellation | b/S | FEC | rate | rank | T | T integer | AWGN | Rayleigh | dBm | mW |
|---|---|---|---|---|---|---|---|---|---|---|
| BPSK | 1 | 4 | 8 | 0.50 | 5.33 | 53 | -3.0 | 3.0 | -3.83 | 0.41 |
| BPSK | 1 | 4 | 7 | 0.57 | 4.67 | 46 | -1.9 | 4.1 | -2.70 | 0.54 |
| BPSK | 1 | 4 | 6 | 0.67 | 4.00 | 40 | -0.8 | 5.3 | -1.58 | 0.70 |
| BPSK | 1 | 4 | 5 | 0.80 | 3.33 | 33 | 0.4 | 6.4 | -0.45 | 0.90 |
| QPSK | 2 | 8 | 16 | 1.00 | 2.67 | 26 | 1.5 | 7.5 | 0.67 | 1.17 |
| QPSK | 2 | 8 | 15 | 1.07 | 2.50 | 25 | 2.1 | 8.1 | 1.26 | 1.34 |
| QPSK | 2 | 8 | 14 | 1.14 | 2.33 | 23 | 2.7 | 8.7 | 1.84 | 1.53 |
| QPSK | 2 | 8 | 13 | 1.23 | 2.17 | 21 | 3.3 | 9.3 | 2.42 | 1.75 |
| QPSK | 2 | 8 | 12 | 1.33 | 2.00 | 20 | 3.8 | 9.8 | 3.01 | 2.00 |
| QPSK | 2 | 8 | 11 | 1.45 | 1.83 | 18 | 4.4 | 10.4 | 3.59 | 2.29 |
| QPSK | 2 | 8 | 10 | 1.60 | 1.67 | 16 | 5.0 | 11.0 | 4.17 | 2.61 |
| QPSK | 2 | 8 | 9 | 1.78 | 1.50 | 15 | 5.8 | 11.8 | 4.92 | 3.11 |
| 16QAM | 4 | 8 | 16 | 2.00 | 1.33 | 14 | 6.5 | 12.5 | 5.67 | 3.69 |
| 16QAM | 4 | 8 | 15 | 2.13 | 1.25 | 13 | 6.8 | 12.8 | 5.92 | 3.91 |
| 16QAM | 4 | 8 | 14 | 2.29 | 1.17 | 12 | 7.0 | 13.0 | 6.17 | 4.14 |
| 16QAM | 4 | 8 | 13 | 2.46 | 1.08 | 11 | 7.3 | 13.3 | 6.42 | 4.39 |
| 16QAM | 4 | 8 | 12 | 2.67 | 1.00 | 10 | 7.5 | 13.5 | 6.67 | 4.65 |

SCHEDULING ALGORITHM FOR LINEAR NETWORKS

CROSS-REFERENCE TO RELATED APPLICATIONS

This application is a U.S. National Stage of International Application No. PCT/IB2016/054659, which claims the benefit of and priority to U.S. Provisional Application Ser. No. 62/201,246, having the title "SCHEDULING ALGORITHM FOR LINEAR NETWORKS," filed on Aug. 5, 2015, the disclosures of which are incorporated herein by reference in their entirety.

TECHNICAL FIELD

The present disclosure is generally related to a multihop network such as a linear wireless sensor network, and a scheduling algorithm for assigning data rates to nodes in the multihop network.

BACKGROUND

Mobile multihop networks have been considered lately as viable alternatives for the delivery and sharing of multimedia content between users.

SUMMARY

One embodiment of a system of the present disclosure, among others, includes a controller that assigns duration slots to a plurality of sensor nodes within a linear wireless sensor network. The system further includes a transmitter that communicates a schedule of the assigned duration slots to the respective sensor node within the linear wireless sensor network.

In one embodiment, the schedule of the assigned duration slots utilizes a duration alphabet of size M whose members comprise $x_1, x_2, \ldots, x_m, \ldots, x_M$, where $x_1 < x_2 < x_m < x_M$. In one further embodiment, the controller utilizes a punctured forward error correction technique to define the respective length of time for the duration slots. In one additional embodiment, the schedule is communicated to the plurality of sensor nodes at startup of the link scheduling controller device.

In one embodiment, the link scheduling controller comprises a receiver that receives a message from the respective node that was transmitted by the respective node during the assigned duration slot for the respective sensor node. In addition, the link scheduling controller device comprises a base station device in an exemplary embodiment. A rate at which data is routed over the linear wireless sensor network changes from link to link and from time to time over the linear wireless sensor network, in one further embodiment. The respective sensor node may also transmit data during the assigned duration slot for the respective sensor node, in one embodiment.

One embodiment of a link scheduling method of the present disclosure, among others, includes assigning duration slots to a plurality of sensor nodes within a linear wireless sensor network; and communicating a schedule of the assigned duration slots to the respective sensor node within the linear wireless sensor network. Further, such a method comprises defining the respective length of time for the duration slots utilizing a punctured forward error correction technique, in one embodiment. In an exemplary embodiment, such a method further comprises receiving a message from the respective node that was transmitted by the respective node during the assigned duration slot for the respective sensor node.

In one embodiment, the schedule of the assigned duration slots utilizes a duration alphabet of size M whose members comprise $x_1, x_2, \ldots, x_m, \ldots, x_M$, where $x_1 < x_2 < x_m < x_M$, in one embodiment. The schedule is communicated to the plurality of sensor nodes at startup of a link scheduling controller device, in one embodiment. Further, the link scheduling controller device comprises a base station device, in an exemplary embodiment. Additionally, a rate at which data is routed over the linear wireless sensor network changes from link to link and time to time over the linear wireless sensor network, in one embodiment. Other systems and methods are also disclosed.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A multihop network, such as a wireless sensor network, includes a plurality of communication devices. An example is a wireless communication device. In a wireless sensor network, each of the communication devices is also a sensor and is referred to as a node. A node transmitting data is a source node. Nodes that transmit or retransmit the data are also called relays.

Figure 1:
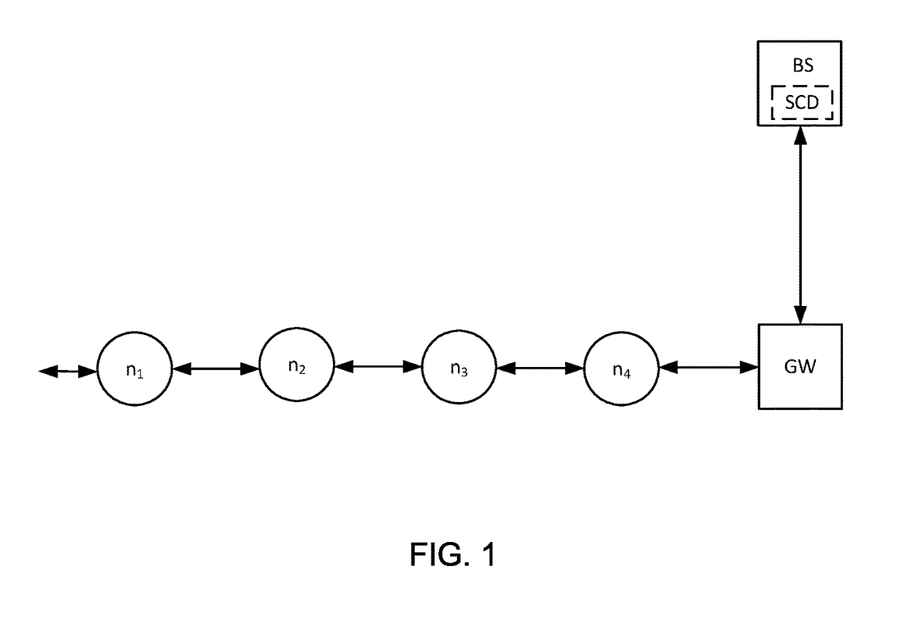
FIG. 1 is a block diagram of linear wireless sensor network architecture in accordance with an embodiment of the present disclosure.

A linear wireless sensor network (LWSN) refers to the case in which sensors are deployed over a line such that data frames are forwarded in a linear fashion along the chain of sensors. Linear wireless sensor networks are seen in multiple industrial applications such as wireless seismic surveys; pipeline monitoring systems; conveyor belts in process facilities; and aluminum smelters, among others. Unlike traditional wireless sensor network applications, real-time monitoring in these applications require linear placement of sensor nodes to detect and report an event of interest to a base station (BS) through gateways (GWs). FIG. 1 illustrates LWSN architecture in accordance with the present disclosure having a series of nodes ($n_i$) in linear placement with a gateway (GW) that is in communication with a base station (BS). In one embodiment, the base station BS utilizes or is integrated with an exemplary scheduling controller device (SCD) of the present disclosure.

Industrial linear wireless sensor networks typically feature deterministic traffic patterns such that each node ($n_i$) needs to sustain the same static data rate, where data is routed from one node to the other over a linear chain. Existing commercial products employ the same rate for all links in the chain, i.e. the time duration for communicating a packet over any link is equal. The total schedule length in that case is known to be (2N−1)X, where N is the number of nodes and X is the link duration. A reduction in the schedule length can be obtained by upgrading the link rate, i.e. reducing the link duration X. However, this comes at the cost of an increase in the average energy consumption.

For example, moving from a link duration $X_M$ to $X_m$, where $X_m < X_M$, mandates spending more energy. In the case of $X_m$, the average energy (averaged over the whole schedule length and over all nodes) is $(N+1)/(4N-2)P_m$, where $P_m$ is the transmit power required to achieve a certain target signal to noise and interference ratio (SINR) over a desired link distance. Therefore, moving the link duration from $X_M$ to $X_m$ incurs an energy penalty equivalent to the ratio $P_m/P_M$, where $P_m > P_M$.

In accordance with the present disclosure, embodiments of an exemplary scheduling controller module or device implement an improved scheduling process such that the targeted reduction in schedule length can be achieve while incurring minimal energy penalty by allowing for a large rate (or duration) selection alphabet: $x_1, x_2, \ldots, x_m, \ldots, x_M$, where $x_1 < x_2 < x_m < x_M$, and such that $\{x_2, x_3, \ldots, x_M\}$ are all integer multiples of $x_1$. Therefore, each rate or duration is unique. This is attributed to the use of punctured forward error correction techniques in certain embodiments.

Figure 2:
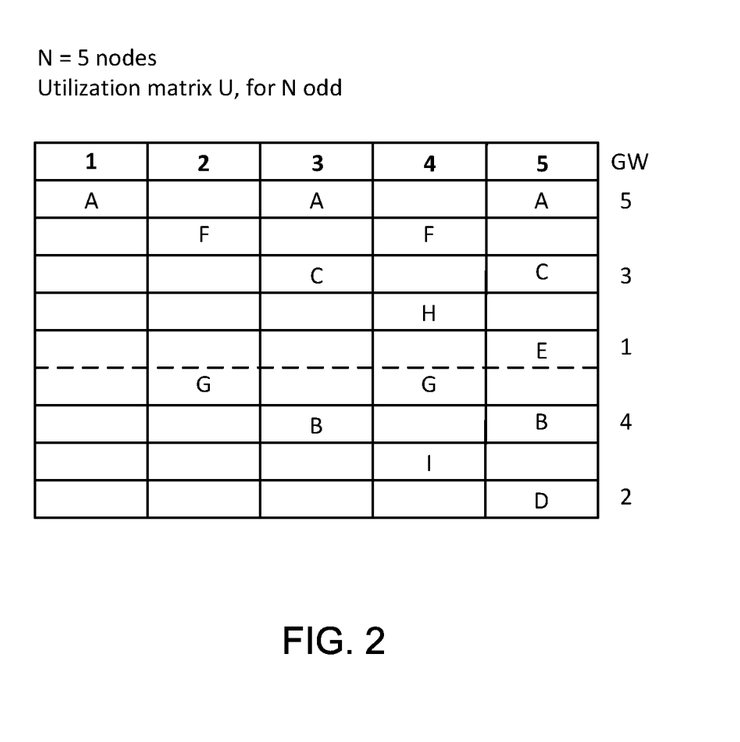
FIG. 2 is a diagram of a network utilization matrix in accordance with an embodiment of the present disclosure.

To help demonstrate advantages of the improved scheduling controller device, reference is made to FIGS. 2-5. First, FIG. 2 illustrates the network utilization matrix for an example of 5 nodes ($n_1, n_2, n_3, n_4, n_5$ with $n_5$ being next to GW) in a linear wireless sensor network. The header row in the matrix corresponds to the serial number of the node in the LWSN. The letters A, B, C, D, E, F, G, H, I, E designate specific realizations of the link duration in space and time, selected from the link duration alphabet $\{x_1, x_2, \ldots, x_M\}$. The selections need not be unique, i.e. the scheduling controller device may select two or more equal link rates for a given node during the lifetime of the schedule. It is noted however that the each row has a unique non-zero value. It is also noted that there must not exist any two non-zero adjacent matrix elements, and this is due to the fact that sensor devices employ half-duplex communications.

Figure 3:
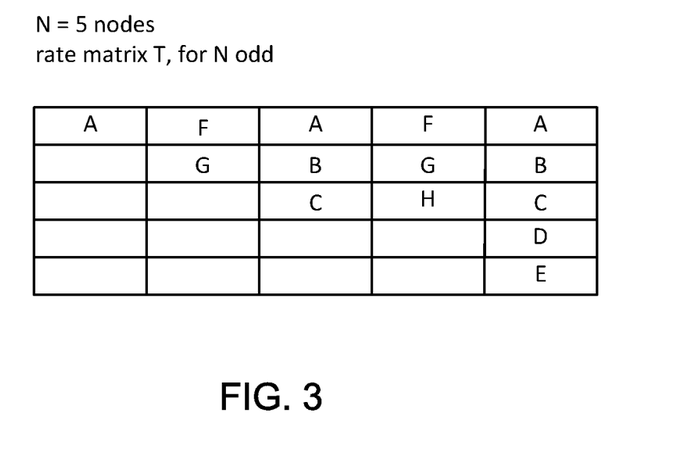
FIG. 3 is a diagram of a rate matrix in accordance with an embodiment of the present disclosure.

Next, the network utilization matrix is translated into a rate matrix T as shown in FIG. 3. The translation from U to T is necessary since the upper-triangular structure of T lends itself to convenient linear algebraic processing as will be explained in the following embodiments.

Figure 4:
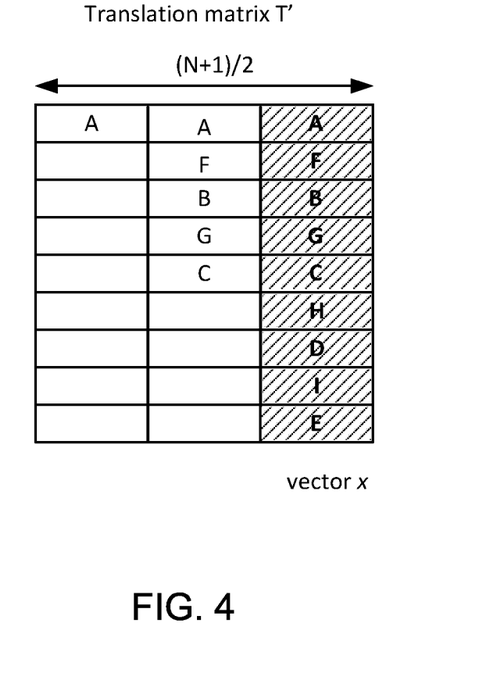
FIG. 4 is a diagram of a translation matrix in accordance with an embodiment of the present disclosure.
Figure 5:
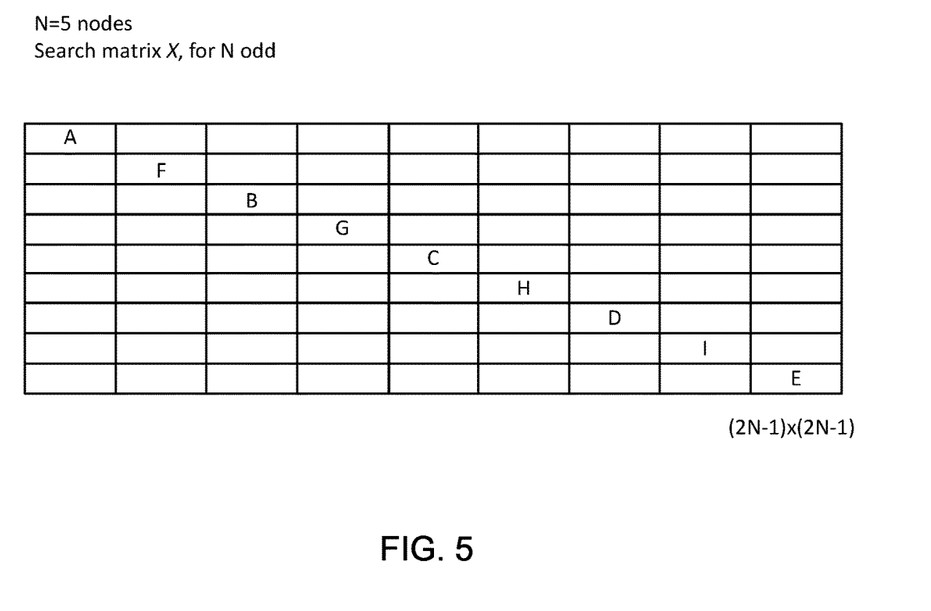
FIG. 5 is a diagram of a search matrix in accordance with an embodiment of the present disclosure.

Then, a translation process is applied to map matrix T into a more compact format T' as shown in FIG. 4. The last column in matrix T' is designated as vector x. It is noted that the any other column in matrix T' is simply a truncation of vector x. As a matter of fact, the truncation is deterministic and is actually a function of the column index in matrix T'. In other words, matrix T' can be entirely constructed from vector x. Following, a squared search matrix X is constructed as shown in FIG. 5. The matrix X is a diagonal matrix such that diag(X)=x.

Figure 6:
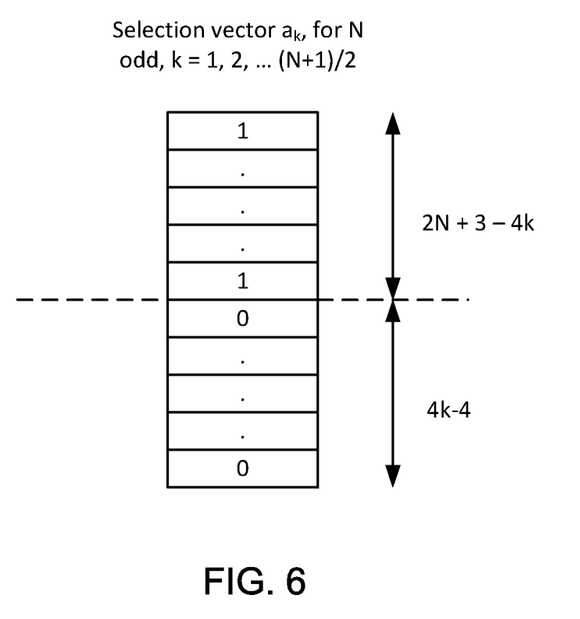
FIG. 6 is a diagram of a selection vector in accordance with an embodiment of the present disclosure.

In order to express the average power consumption (β) under the improved scheduling algorithm executed by the scheduling controller device, a selection vector $\underline{a}_k$ (FIG. 6) is used with the search matrix X as given in Equation 1:

$$\beta = \frac{\sum_{k=1}^{\frac{N+1}{2}} \sum_{i=1}^{I} c_i \underline{a}_k^T \tilde{X} \underline{a}_k}{N \underline{a}_1^T \tilde{X} \underline{a}_1} \quad \text{(Eq. 1)}$$

We then opt to solve the optimization problem given in Equation 2:

$$\underset{\tilde{X}}{\operatorname{argmin}} \beta \text{ such that } \underline{a}_1^T \tilde{X} \underline{a}_1 \leq t \quad \text{(Eq. 2)}$$

This is to compute the search matrix X which results in minimizing the average power consumption subject to a desired upper bound t on the total schedule length.

Figure 7:
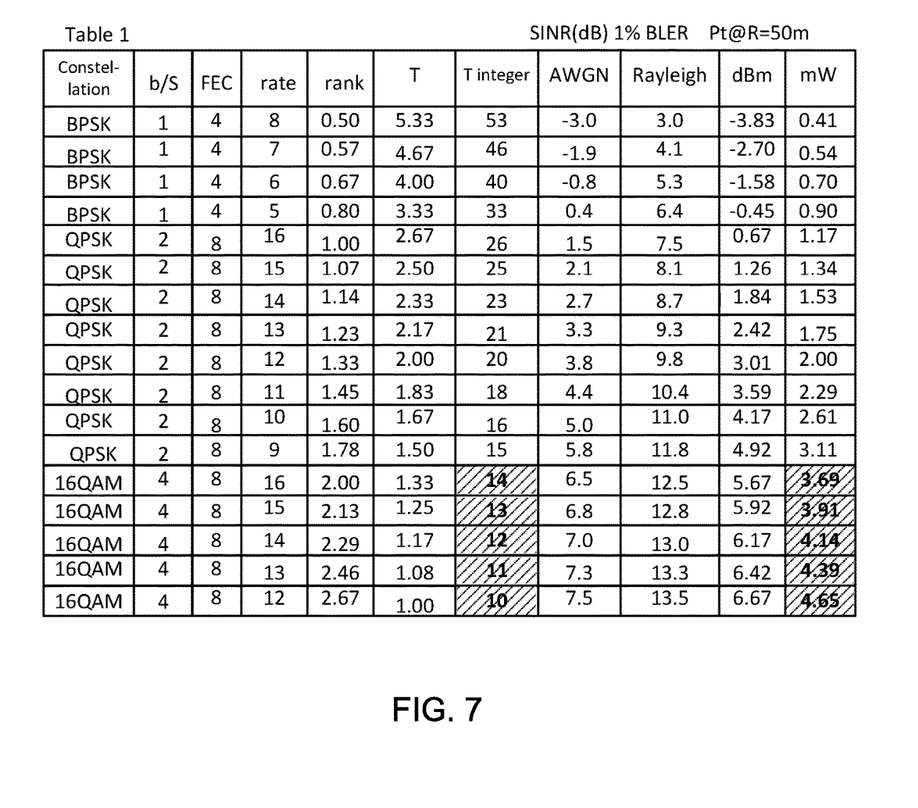
FIG. 7 is a diagram of a table of physical layer values of an industrial system.
Figure 8:
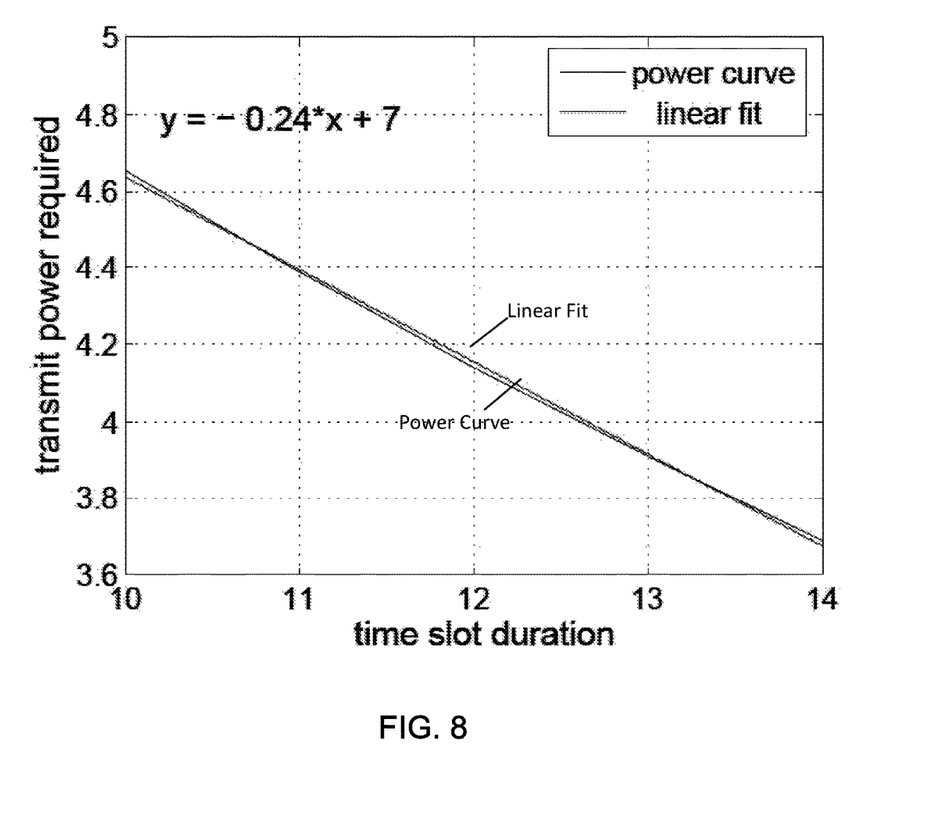
FIG. 8 is a diagram illustrating a linear relationship between power and link duration for an embodiment of the present disclosure using values from FIG. 7.

The following example is provided to illustrate the improvement attained by the devised scheduling algorithm for one embodiment. Table 1 of FIG. 7 shows the typical physical layer values of an industrial system. In this example, the last 5 rows inside the box are used (and are highlighted in the figure). The relationship between power and link duration can be fit into a decreasing monotone polynomial. In this case, it is shown in FIG. 8 that a linear relationship fits well. From solving the optimization problem (Equation 2), the result obtained 80% of the schedule length improvement (reduction) by using only 57% of the energy cost that would have been expended in classical or conventional method(s). In contrast, classical scheduling methods can only attain an 80% reduction in the schedule length provided at least 80% more energy is consumed.

For illustration purposes, consider wireless seismic applications, where energy efficiency and data production capacity are two prime objectives yet one can be only achieved at the expense of the other. The improved scheduling technique of the present disclosure offers the ability to increase the reach of the seismic line and/or spatial density of nodes (i.e. number of nodes per line) while maintaining the average battery lifetime of nodes. Alternatively, it is able to increase the average battery lifetime while maintaining the data streaming rate per node.

After determining an updated link schedule for the LWSN, the resulting schedule can be communicated to all nodes ($n_i$) within the network upon start up by the scheduling controller device SCD, in one embodiment. Scheduling techniques in accordance with the present disclosure can be shown to offer better results as the number of nodes per line, N, increases. Accordingly, scheduling techniques in accordance with the present disclosure are not limited to the specific examples expressed herein.

As shown in Equations 3 and 4 (below), a cost metric C eventually tends to be a decreasing monotone in N as N increases. The cost metric C corresponds to the case of moving from link duration $x_M$ to $x_m$. The numerator of metric C is the excess power consumption under the improved scheduling algorithm whereas the denominator is the excess consumption under the classical fixed link duration method. Thus, it may be concluded that scheduling techniques in accordance with the present disclosure have better results as N increases. This is indeed an advantage taking into consideration that some linear industrial networks extend to tens if not hundreds of nodes.

Equation 3

$$C = \frac{\beta_{min}(N) - \left(\frac{N+1}{4N-2}\right)P_m}{\left(\frac{N+1}{4N-2}\right)(P_M - P_m)} = \frac{1}{P_M - P_m}\left[\left(\frac{4N-2}{N+1}\right)\beta_{min}(N) - P_m\right] \quad (\text{Eq. 3})$$

Equation 4

$$\lim_{N \to \infty} C = 4 \lim_{N \to \infty} \frac{\sum_{k=1}^{(N+1)/2} \sum_{i=1}^{l} c_i a_k^T \tilde{X} * a_k}{N a_1^T \tilde{X} * a_1} = 0 \quad (\text{Eq. 4})$$

Figure 9:
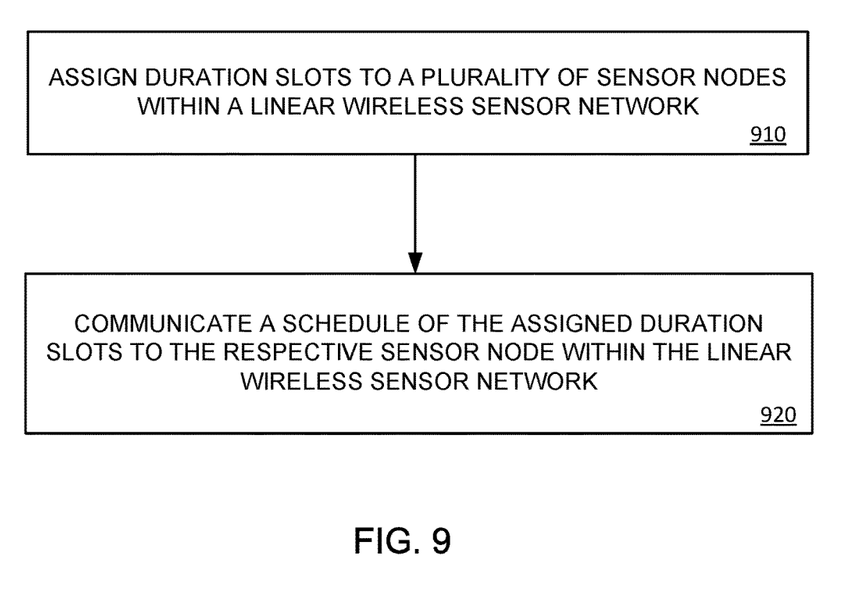
FIG. 9 is a flowchart diagram illustrating a method in a linear wireless sensor network for scheduling transmission resources according to an embodiment of the present disclosure.

FIG. 9 is a flowchart diagram illustrating a method in a linear wireless sensor network (LWSN) for scheduling transmission resources according to an exemplary embodiment of the present disclosure. This exemplary method may e.g. be implemented in the LWSN in FIG. 1 for scheduling of duration time slots (and the associated rates) on all links within the LWSN. Such a method includes assigning (910) duration slots to a plurality of sensor nodes within a linear wireless sensor network. The method further includes communicating (920) a schedule of the assigned duration slots to the respective sensor node within the linear wireless sensor network. Additional actions may be performed in various embodiments including defining the respective length of time for the duration slots utilizing a punctured forward error correction technique and receiving a message from the respective node that was transmitted by the respective node during the assigned duration slot for the respective sensor node, among others.

In the context of the exemplary LWSN illustrated in FIG. 1, the base station BS of FIG. 1 performs most of the method steps of FIG. 9 or in cooperation with other network nodes, such as gateway device GW. Thus, the base station BS provides one exemplary embodiment of a link scheduling controller apparatus according to the present disclosure for determining and scheduling transmission resources for a LWSN.

Figure 10:
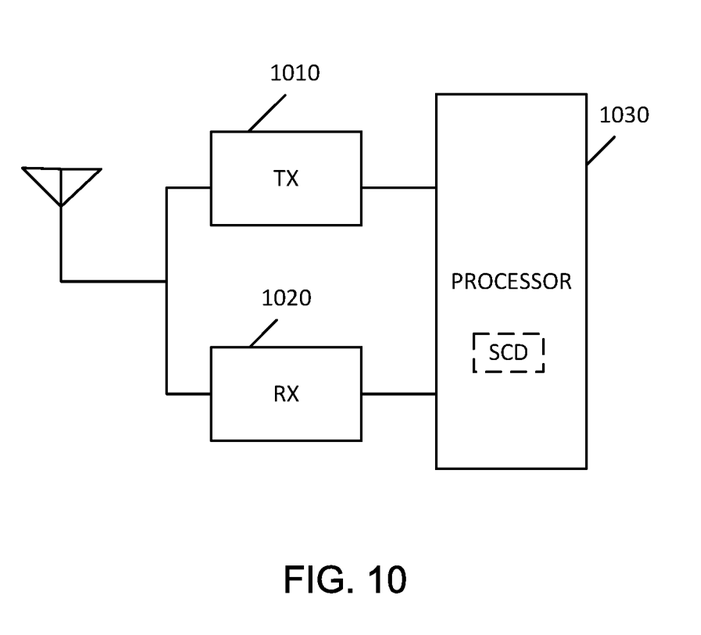
FIG. 10 is a block diagram illustrating an embodiment of a base station according to an embodiment of the present disclosure.

FIG. 10 schematically illustrates an exemplary embodiment of a base station (e.g. BS in FIG. 1) according to an embodiment of the present disclosure for implementing the method illustrated in FIG. 9. The base station BS includes a transmitter 1010 and a receiver 1020, both operable connected to digital data processing circuitry in the form of a programmable processor 1030. The transmitter 1010 is adapted to transmit and the receiver 1020 is adapted to receive radio signals. The processor 1030 controls and coordinates the operations of the transmitter 1010 and the receiver 1020. The processor is in particular programmed to perform scheduling operations in accordance with FIG. 9, in one embodiment.

Digital data processing circuitry in the form of a programmable processor is used for scheduling controller device (SCD) functionality. However, any digital data processing circuitry capable of performing these processing tasks could be used, e.g. multiple processors working in series or in parallel, ASICs (an application specific integrated circuits), discrete logic circuits etc. Programmable devices performing processing according to the present disclosure, can be dedicated to this task or used also for processing related to other tasks. Instead of having the base station BS acting as a scheduling controller device SCD according to the present disclosure for scheduling transmission resources, other nodes in the LWSN communication network could act as such scheduling controller modules or devices.

Further details and information on components of wireless sensor network architecture in accordance with embodiments of the present disclosure are described in WO/2014/072830 publication, titled "An Improved Channel Assessment Scheme" and WO/2014/076577 publication, titled "An Improved Packet Structure," which are incorporated herein in their entireties.

Certain embodiments of the present disclosure can be implemented in hardware, software, firmware, or a combination thereof. In one embodiment(s), the scheduling controller device (SCD) is implemented in software or firmware that is stored in a memory and that is executed by a suitable instruction execution system. If implemented in hardware, as in an alternative embodiment, the SCD can be implemented with any or a combination of the following technologies, which are all well known in the art a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations in which functions may be executed out of order from that shown or discussed, including substantially concurrently or in reverse order, depending on the functionality involved, as would be understood by those reasonably skilled in the art of the present disclosure.

It should be emphasized that the above-described embodiments are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure and protected by the following claims.

The invention claimed is:

1. A link scheduling controller device comprising:
   a controller that assigns different duration slots to a plurality of sensor nodes within a linear wireless sensor network; and
   a transmitter that communicates a schedule of the assigned duration slots to the respective sensor nodes within the linear wireless sensor network,
   wherein the controller calculates the different duration slots to minimize an average power consumption of the plurality of sensor nodes, based on a search matrix X, and subject to an upper bound on a total length of the schedule.

2. The link scheduling controller device of claim 1, wherein the schedule of the assigned duration slots utilizes a duration alphabet of size M whose members comprise $x_1, x_2, \ldots, x_m, \ldots, x_M$, where $x_1 < x_2 < x_m < x_M$.

3. The link scheduling controller device of claim 1, wherein the controller utilizes a punctured forward error correction technique to define the respective length of time for the duration slots, and is further configured to,
generate a utilization matrix U for the plurality of sensor nodes;
generate, using the utilization matrix U, a rate matrix T;
generate, using the rate matrix T, a translation matrix T', wherein the translation matrix T' is smaller than the rate matrix T; and
generate, using the translation matrix T', the search matrix X.

4. The link scheduling controller device of claim 1, wherein the schedule is communicated to the plurality of sensor nodes at startup of the link scheduling controller device.

5. The link scheduling controller device of claim 1, further comprising a receiver that receives a message from the respective node that was transmitted by the respective node during the assigned duration slot for the respective sensor node.

6. The link scheduling controller device of claim 1, wherein the link scheduling controller device comprises a base station device.

7. The link scheduling controller device of claim 1, wherein a rate at which data is routed over the linear wireless sensor network changes from link to link and from time to time over the linear wireless sensor network.

8. The link scheduling controller device of claim 1, wherein the respective sensor node transmits data during the assigned duration slot for the respective sensor node.

9. A link scheduling method comprising:
assigning different duration slots to a plurality of sensor nodes within a linear wireless sensor network; and
communicating a schedule of the assigned duration slots to the respective sensor node within the linear wireless sensor network,
wherein the different duration slots are calculated, with a controller of the linear wireless sensor network, to minimize an average power consumption of the plurality of sensor nodes, based on a search matrix X, and subject to an upper bound on a total length of the schedule.

10. The link scheduling method of claim 9, wherein the schedule of the assigned duration slots utilizes a duration alphabet of size M whose members comprise $x_1, x_2, \ldots, x_m, \ldots, x_M$, where $x_1 < x_2 < x_m < x_M$.

11. The link scheduling method of claim 9, further comprising:
generating a utilization matrix U for the plurality of sensor nodes;
generating, using the utilization matrix U, a rate matrix T;
generating, using the rate matrix T, a translation matrix T', wherein the translation matrix T' is smaller than the rate matrix T; and
generating, using the translation matrix T', the search matrix X.

12. The link scheduling method of claim 9, wherein the schedule is communicated to the plurality of sensor nodes at startup of a link scheduling controller device.

13. The link scheduling method of claim 12, wherein the link scheduling controller device comprises a base station device.

14. The link scheduling method of claim 9, wherein a rate at which data is routed over the linear wireless sensor network changes from link to link and time to time over the linear wireless sensor network.

15. The link scheduling method of claim 9, further comprising receiving a message from the respective node that was transmitted by the respective node during the assigned duration slot for the respective sensor node.

16. A link scheduling method comprising:
generating a utilization matrix for a plurality of sensor nodes in a linear wireless sensor network;
generating, using the utilization matrix, a rate matrix;
generating, using the rate matrix, a translation matrix, wherein the translation matrix is smaller than the rate matrix;
generating, using the translation matrix, a search matrix that minimizes average power consumption by the plurality of sensor nodes subject to an upper bound on a total length of a schedule;
assigning, using the search matrix, duration slots to the plurality of sensor nodes; and
communicating a schedule of the assigned duration slots to at least one of the plurality of sensor nodes.

17. The link scheduling method of claim 16, wherein the minimization of the average power consumption is based on a selection vector used with the search matrix.

18. The link scheduling method of claim 16, wherein the schedule of the assigned duration slots utilizes a duration alphabet of size M whose members comprise $x_1, x_2, \ldots, x_m, \ldots, x_M$, where $x_1 < x_2 < x_m < x_M$.

19. The link scheduling method of claim 16, further comprising:
defining a respective length of time for the duration slots utilizing a punctured forward error correction technique.

20. The link scheduling method of claim 16, wherein a rate at which data is routed over the linear wireless sensor network based on the schedule changes from link to link and time to time over the linear wireless sensor network.

* * * * *